United States Patent [19]
Liu

[11] Patent Number: 5,117,495
[45] Date of Patent: May 26, 1992

[54] METHOD OF SORTING DATA RECORDS

[75] Inventor: Peter Liu, Paramus, N.J.

[73] Assignee: Syncsort Incorporated, Woodcliff Lake, N.J.

[21] Appl. No.: 489,686

[22] Filed: Mar. 7, 1990

[51] Int. Cl.⁵ .................................................. G06F 7/08
[52] U.S. Cl. ..................................................... 395/600
[58] Field of Search ................................ 364/200, 900

[56] References Cited

U.S. PATENT DOCUMENTS 4,587,628  5/1986  Archer et al. ...................... 364/900
4,809,158  2/1989  McCauley ............................ 364/200

OTHER PUBLICATIONS

*IBM Enterprise Systems Architecture 1370: Principles of Operation* pp. 15-16 to 15-29.

J. Donovan *Systems Programming* pp. 352-357.

Alfred V. Aho, "Data Structures and algorithms," 1983, pp. 349-354.

*Primary Examiner*—Dale M. Shaw
*Assistant Examiner*—Andrew Bodendorf
*Attorney, Agent, or Firm*—Amster, Rothstein & Ebenstein

[57] ABSTRACT

An improved process for sorting data records by computer is disclosed. The process utilizes scatter-writing techniques to write data records directly from a data input area to an external storage device and to write data records directly from a merge input area directly to the external storage device. This increases the speed of the sorting process and makes more efficient use of the computer memory.

9 Claims, 2 Drawing Sheets

METHOD OF SORTING DATA RECORDS

BACKGROUND OF THE INVENTION

The process of sorting data records using a computer usually involves reading a series of unordered data records from an input file on an external storage medium, such as magnetic tape, disk, cards, etc., ordering these data records into the desired sequence and writing the sorted data records to an output file on a second external storage medium. The sorting process generally requires a large share of the resources of a computer system and a significant amount of computer time. The present invention provides a sorting method which requires a smaller share of computer resources and reduced computing time.

Sorting a large number of data records usually requires a two stage process. The first stage is the initial sorting of as many data records as can be accommodated by the computer memory, and creating strings of sorted data records. The second stage involves merging these strings of data records into a final desired sequence of sorted data records.

Known techniques for sorting require the following thirteen steps to perform the two stages sorting process: (1) initializing; (2) reading a portion of the data records from the input file into first computer memory locations, called the data input area; (3) extracting sort keys from the data records and writing copies of the sort keys, along with pointers to each data record, into second computer memory locations, called the key extraction area; (4) sorting the keys in the key extraction area; (5) moving the data records from the data input area to third computer memory locations, called the sort-work output area; (6) writing the data records in sorted sequence as a string to an external storage device; (7) repeating steps 2 through 6 until all data records have been processed; (8) reinitializing; (9) reading a portion of data from each string into fourth computer memory locations, called the merge input area; (10) merging the data records by moving the sequentially foremost data record, called the "winner," into fifth computer memory locations, called the sort output area; (11) writing the sorted data records from the sort output area to an external storage device; (12) repeating steps 10 and 11 until all data records in the merge input area from at least one of the strings are exhausted; and (13) repeating steps 9 through 12 until all data records in all strings have been processed. Steps 1 through 7 constitute the first or initial sort stage; steps 8 through 13 constitute the second or merge stage. Each of these steps will now be described in greater detail.

In step 1, control information describing the data to be sorted, the desired sorting sequence, (ascending or descending), location and characteristics of the keys which determine the ordering of a data record, etc. is obtained. Several sections of internal computer memory are also established. For purposes of this explanation only the areas of computer memory necessary to understand this disclosure will be described. (1) A data input area ("DIA") which contains the records to be sorted. I/O commands to read the data from the input file will place the records into the data input area. (2) The key extraction area which contains copies of the sort keys of individual records. The key extraction area is not an essential element of the invention but will aid the description. (3) The sort-work output area ("SWK") which serves as a collection area for records in sorted order. These sorted records will be written from the sort-work output area to an intermediate external storage device. The sort-work output area consists of one or more sort-work output area buffers. Each buffer is a contiguous area of computer memory generally containing one or more records in sorted order.

Any of these memory areas may be one large contiguous section of memory or several smaller contiguous sections of memory. For description purposes only, these memory areas will be described as though they are one contiguous area. During the initialization step, these three areas (data input area, sort-work output area, key extraction area) are set to an empty state.

In step 2 some unsorted data records are read from the input file by issuing one or more I/O commands to the external storage device containing the input file. The input data records are placed into the data input area in an arbitrary order. At this point in the process, the key extraction area and sort-work output area remain empty.

Step 3 extracts a sort key from each record and places a copy of it in the key extraction area. At this time, it is helpful to associate a pointer (record location or address) to the original record with each sort key in the key extraction area. During the key extraction process, the key may be modified such as by compaction, translation, or expansion, or by adding other useful information to each sort key. Generally the sort key and pointer are much smaller than the data records, so the key extraction area is usually smaller than the data input area.

Step 4 sorts the entries in the key extraction area into the desired order. This may be accomplished by any of the many available sorting techniques (Quicksort, bubble sort, or other sorting techniques). The sort step results in the key extraction area entries being ordered based on the values of the extracted sort keys.

In Step 5, the data records are moved from the data input area to the sort-work output area in sorted order. This is accomplished by using the ordered entries in the key extraction area to determine which record to move from the data input area to the sort-work output area. A series of data records in sorted order, as those now stored in the sort-work output area, is called a string.

Step 6 writes the string from the sort-work output area to the external storage device. This is done using one or more I/O commands which transfer the data records in the sort-work output area to the external storage device. An I/O command may transfer one or more sort-work output area buffers (each buffer being a contiguous area of computer memory containing several data records) to the external storage device.

Step 7 repeats steps 2 through 6 until all the data records from the input file have been read, sorted, and written to the external storage device as ordered strings. This completes the first stage of the process.

At this point, the second stage in the process, called merging, begins. In this stage, the sorted strings stored in the external storage device are read into computer memory and the data records from each string are interleaved based on the value of their sort keys, producing the final, fully sorted output file.

The prior art merging stage starts with step 8, which is a different initialization than used during the first stage. The purpose of this step is to establish two sections of computer memory. The first section is the merge input area ("MIA"), which will receive the records read from the strings in the external storage device. The second section of computer memory established is the data output area which will contain the final sorted records after they have been moved from the merge input area. Any section of the data output area will consist of one or more data output area buffers, which act in the same manner as the sort-work output area buffers. As with the memory areas allocated in the first stage, these memory areas can be one large contiguous section of computer memory or several smaller areas.

Step 9 reads some of the data records from each of the strings stored in the external storage device into the merge input area. One or more I/O operations will be issued to the external storage device to read a portion of the records from each string. The number of data records to be read is based upon the size of the merge input area and the number of strings. An approximately equal number of data records from each string is read into the merge input area.

In step 10, the data records from the strings are merged and the resulting ordered records are moved to the data output area. Conceptually the merge process compares the value of the sort key from the next record from each string to find the record with the smallest key (assuming that the records are to be sorted in increasing value of the key). This data record is the "winner" and is then moved into the data output area.

Step 11 writes the sorted records from the data output area to the output file. One or more I/O commands will be used to transfer the data records from the data output area buffers to the output file. Each I/O command may transfer the data records from one or more buffers. Each data output area buffer is a contiguous area of computer memory containing one or more records.

Step 12 repeats steps 10 and 11 until all the data records from any particular string have been exhausted from the merge input area.

Step 13 repeats steps 9 through 12 until all the data records have been processed. In this manner, the merge input area is refreshed with further data records. With the completion of this step the final output of sorted data records are stored in the output file.

In cases of extremely great numbers of data records it may be necessary to perform the merge stage more than once. In such cases, after the intermediate merge, the output files are again merged.

The above process is described as a series of sequential steps for ease of description only. For efficiency, sort implementations try to obtain as much concurrency in these steps as possible. An example of this would be to read data records into the data input area concurrently with writing strings to the external storage device.

SUMMARY OF THE INVENTION

While the prior art process does provide for sorting of large number of data records, there is a need to make the sorting process as fast and efficient as possible. It is therefore a primary object of the present invention to provide a sorting technique for sorting and merging a large number of data records in a more efficient manner.

Another object of the present invention is to provide a sorting method that is faster than prior sorting methods.

A further object of the present invention is to provide a sorting method which uses the available computer memory more efficiently.

A still further object of the present invention is to provide a sorting method which uses less computer memory than prior sorting methods.

These and the object of the invention are accomplished by eliminating two steps of the prior art process, described above. In accordance with the invention, in the first stage the data records are written directly from the data input area to the external storage device in sorted order, thereby eliminating the movement of the records to a sort-work output area and also eliminating the need for the sort-work output area. In the merging stage the data records are written directly from the merge input area to the external storage device, thereby eliminating the movement of the records to the sort output area and also eliminating the need for a sort output area.

Further objects of this invention will become apparent by reference to the following description of a presently preferred but nonetheless illustrative embodiment of the invention in conjunction with the drawings. This description is for the purpose of fully disclosing the invention without placing limitations thereon.

DETAILED DESCRIPTION OF THE INVENTION

The present invention performs the same function as the prior art, but does so using an eleven step process instead of a thirteen step process. Specifically, steps 5 and 6 of the prior art process are eliminated and replaced with a single step. Likewise, steps 10 and 11 of the prior art process are eliminated and replaced with a single step. In this way, the process performed by the present invention is faster and uses the available computer memory more efficiently.

Figure 1:
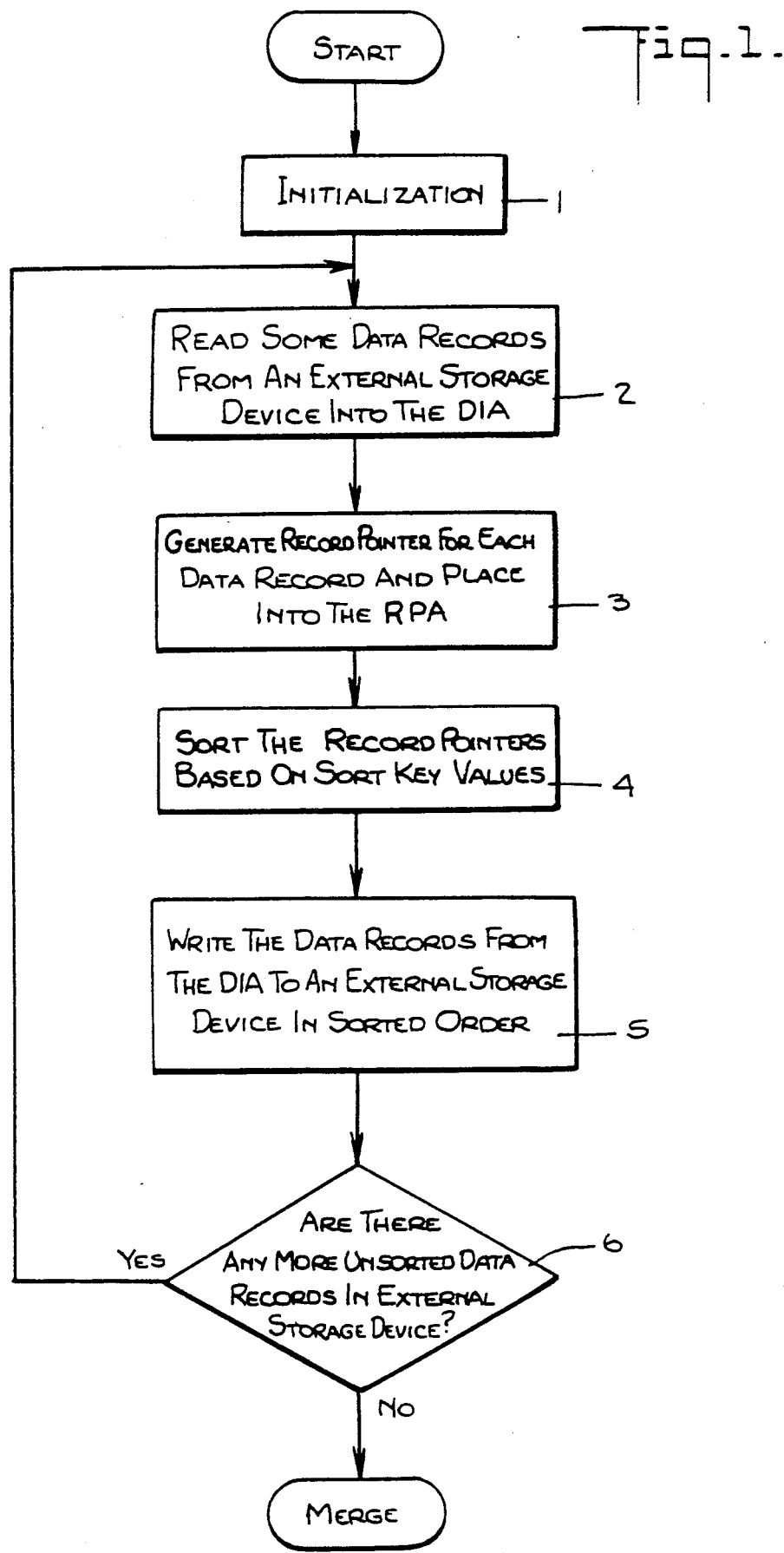
FIG. 1 is a flowchart depicting the improved initial sort stage of the data record sorting process of the invention.
Figure 2:
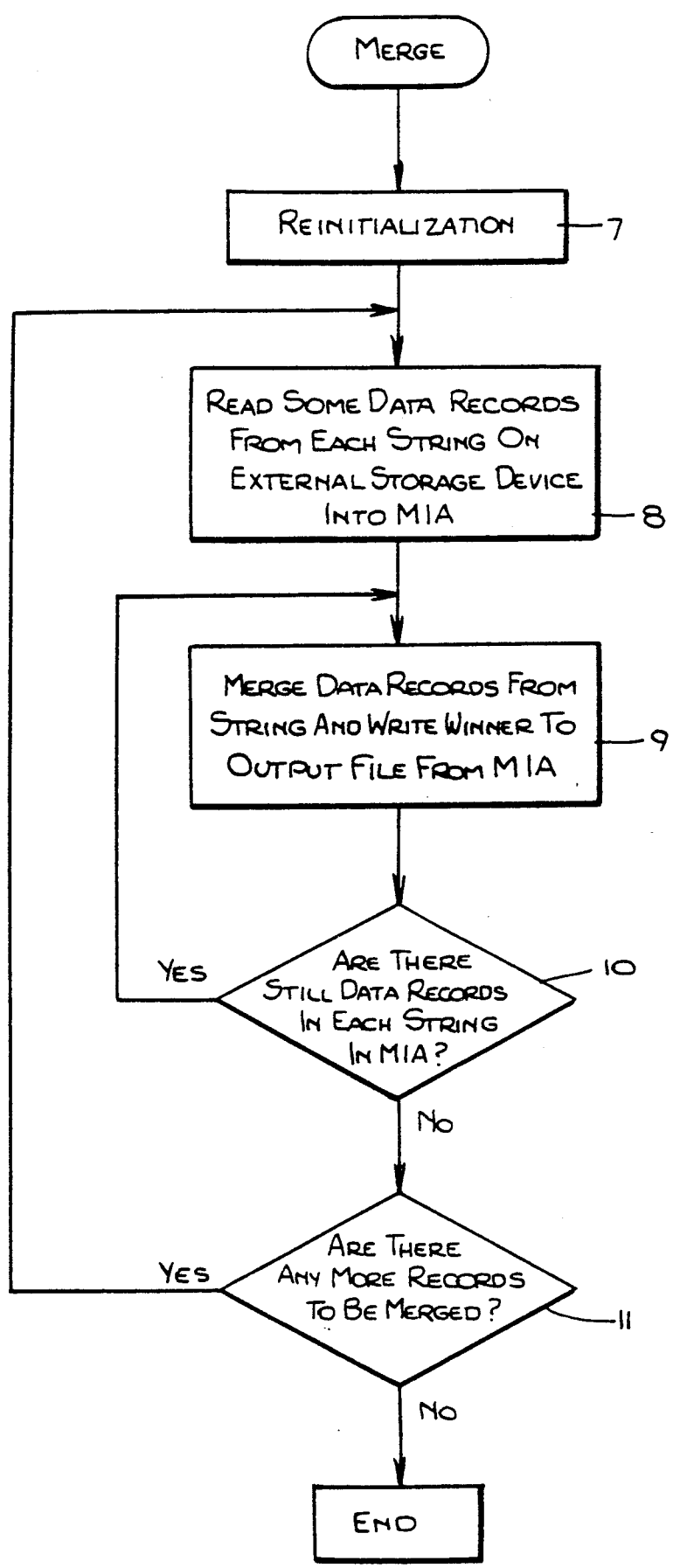
FIG. 2 is a flowchart depicting the improved merge stage of the data record sorting process of the invention.

FIGS. 1 and 2 are flowcharts showing the method of sorting and merging using the present invention. The steps of this method will now be described.

Referring to FIG. 1, step 1 is the initialization step. As in the prior art, control information is obtained and sections of the computer memory are established. The present invention requires only a data input area and a record pointer area ("RPA"). No sort-work output area is needed. This allows the sorting method to be carried out using less computer memory. However, it is preferable to use the memory savings by increasing the memory allocated to the data input area and the record pointer area.

Step 2 is identical to step 2 of the prior art. Unsorted data records are read from an input file and placed in the data input area. In the preferred embodiment, because the data input area is larger than the prior art, more data records may be read into the data input area.

In step 3 record pointers are generated for the data records and placed into the record pointer area. Sort keys may also be extracted and placed in the record pointer area associating each sort key with its respective record pointer. Because the record pointer area has been allocated more space, more record pointers may be handled.

Step 4 is also identical to step 4 of the prior art. This step is the sorting of the record pointers based on the sort key values into ascending or descending order by use of available sort techniques.

In step 5, a string of data records is written directly from the data input area to the external storage device in an order corresponding to the order of the record pointers. In the preferred embodiment, this is accomplished using one or more "scatter-write" I/O commands which transfer the data records to the external storage device. A scatter-write I/O command will transfer the individual data records directly from the data input area without the need for a separate move of the data records to a contiguous buffer area (sort-work output area) as in the prior art. Scatter-write I/O commands access data items from discrete locations in computer memory and assemble them into a contiguous block on the external storage device without using the CPU to perform the assembly into contiguous blocks. In the preferred embodiment the data blocks written on the external storage device using the scatter-write technique are identical to those written by the prior art process.

One implementation of the scatter-write I/O command on IBM mainframe computers is to use data-chained command words (CCWs). Each data-chained CCW points to a discrete record in the data input area. A set of data-chained CCWs is used to link together a set of records (in sorted order) into one contiguous block as they are written to the external storage device.

In step 6, steps 2 through 5 are repeated until all the data records from the input file have been read, sorted, and written to the external storage device as ordered strings. This completes the first stage of the process and the process goes to the merge stage.

In accordance with this first aspect of the invention, the first stage of the process can be accomplished more quickly. Another advantage that is realized by the invention is that by having more computer memory available, more data records can be sorted at one time and stored in each string. This means that in large jobs fewer strings will have to be handled in the merge stage.

Referring to FIG. 2, the merge stage starts with step 7. As in step 8 of the prior art process the computer is again initialized by obtaining control information and allocating memory. Unlike the prior art process, the process of this invention does not need a sort output area. This allows more computer memory to be allocated to the merge input area, which in turn allows more data records to be accommodated in the merge, resulting in more efficient use of computer memory.

Step 8 is identical to step 9 of the prior art process. Some data records from each string stored on the external storage device are read into the merge input area. Having used the disclosed invention in the first stage of the sorting process, there will now be fewer strings to merge. This allows more data records from each string to be read into the merge input area. The larger merge input area allows even more data records from each string to be read into the merge input area.

In step 9 the data records are merged and written directly from the merge input area to the output file. A scatter-write I/O command transfers the winning data record directly to the output file. This process is repeated until scatter-write I/O commands have transferred all the records of all the strings in the merge input area. These scatter-write I/O commands may be linked into one or more I/O operations to write the data in sorted order to the output file.

In step 10 of the invention, step 9 is repeated until all data records from any particular string are exhausted from the merge input area.

Step 11 of the invention repeats steps 8, 9, and 10 until all the data records have been processed and the final sorted order is stored in the output file.

While the above description describe the new process as a series of sequential steps, this is for ease of description only and is not essential to the invention. For efficiency as much concurrency in these steps as possible is achieved.

In some sort applications with very large volumes of data to be sorted or only small amounts of computer memory available to the sort program, more strings are generated by the first stage than can be merged together into the output file during the merge stage. In this case, several stages of intermediate merging are employed which are conceptually similar to the previously described final merge. In this intermediate merge stage several strings are read into computer memory from the external storage device and merged into one larger string and written back to external storage device. This process is repeated until the number of strings remaining is small enough to be merged into the output file.

The intermediate merge stage of the invention removes the need to move records to a merge output area by using scatter-write I/O commands to access individual data records in discrete locations in merge input area of computer memory and transfer them to external storage device as contiguous blocks.

To illustrate the benefits of the invention, several tests were conducted using an implementation of the prior art and the claimed invention. All tests were run on an IBM 3090-200 CPU operating under an MVS/XA System and used IBM 3380 disk devices to hold the input and output files and also for the external storage device. Each data record contained 300 bytes. The results are shown in Table 1 below and show a reduction in the CPU time required for sorting ranging from 26% to 48%

TABLE 1

| Number of Records | CPU Time (Seconds) | | Percent Improvement |
|---|---|---|---|
| | Prior Art | Invention | |
| 20,000 | 1.19 | 0.88 | 26 |
| 50,000 | 2.15 | 1.60 | 25 |
| 75,000 | 3.06 | 1.89 | 38 |
| 100,000 | 3.98 | 2.16 | 46 |
| 150,000 | 5.89 | 3.08 | 48 |

What has been described are the presently preferred embodiments of the invention. Those skilled in the art will recognized that modifications thereto can be made while still within the scope of the invention as set forth in the claims set forth below.

What is claimed is:

1. A computer process for storing unsorted data records in an external storage device in a desired order comprising the steps of:
   (A) storing the unsorted data records in first preallocated computer memory locations,
   (B) generating a record pointer for each data record stored in the first memory locations and storing the record pointers in second preallocated computer memory locations,
   (C) sorting the record pointers into the desired order, and (D) sequentially writing each data record to the external storage device directly from the first memory locations in an order corresponding to the sorted order of the record pointers associated with the data records.

2. The process of claim 1 wherein the writing step is performed using a scatter-write technique.

3. The process of claim 1 further comprising repeating the steps of storing, generating, sorting, and writing data records to the external storage device and thereafter merging all of the data records stored on the external storage device into a final desired order.

4. The process of claim 1 further comprising the step of extracting a sort key from each data record and associating each record pointer with its corresponding sort key after the generating step.

5. A computer process for storing unsorted data records in an external storage device in a desired order, comprising the steps of:

(A) reading less than all of the unsorted data records from a first external storage device and storing the data records in first preallocated computer memory locations, (B) generating a record pointer for each data record stored in the first memory locations and storing the record pointers in second preallocated computer memory locations, (C) sorting the record pointers into the desired order, (D) sequentially writing each data record to a second external storage device directly from the first memory locations in an order corresponding to the sorted order of the record pointers associated with the data records to form a first string, (E) repeating steps A through D until all unsorted data records are written to the second external storage device as a plurality of strings, and (F) merging the data records of all the strings into the desired order.

6. The process of claim 5 wherein the writing step is performed using a scatter-write technique.

7. The process of claim 5 further comprising the step of extracting a sort key from each data record and associating each record pointer with its corresponding sort key after the generating step.

8. A process for merging strings of data records stored in a memory associated with the computer, each string of data records being arranged in a desired order, to sort the data records into a final desired order in a computer, comprising the steps of:

(A) reading from the associated memory at least one data record from each string and storing the data records in preallocated computer memory locations, (B) selecting from the data records in the preallocated computer memory locations a data record having a preselected relationship to the other data records, (C) writing the selected data record to an external storage device directly from the preallocated computer memory locations, (D) reading additional data records from the associated memory and storing the additional data records in the preallocated computer memory locations when the remaining data records in the preallocated computer memory locations from any string reaches a preselected limit, (E) repeating steps B, C, and D until all data records have been sorted into the final desired order.

9. The process of claim 8 wherein the writing step is performed using a scatter-write technique.

* * * * *